Dec. 25, 1951
M. J. BOZICH
2,580,215
APPARATUS FOR UNLOADING PULVERULENT
MATERIAL FROM TRANSPORTATION TANKS
Filed Nov. 4, 1948
2 SHEETS—SHEET 1
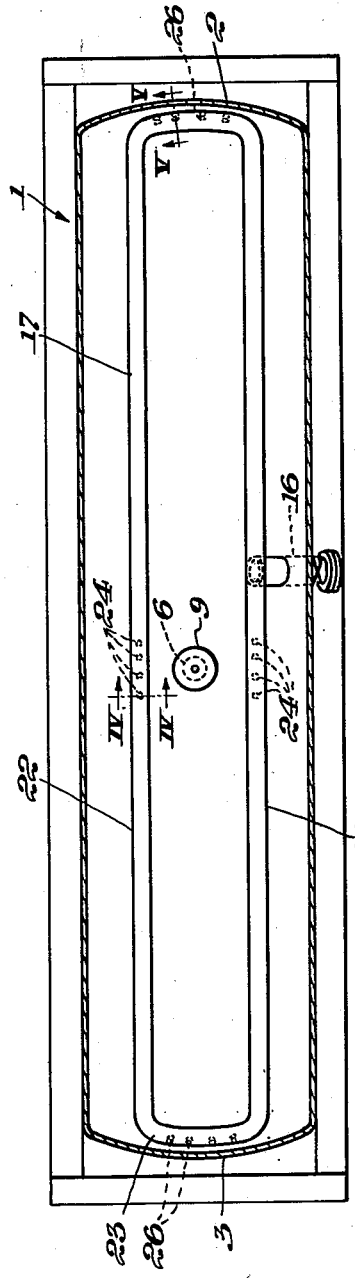
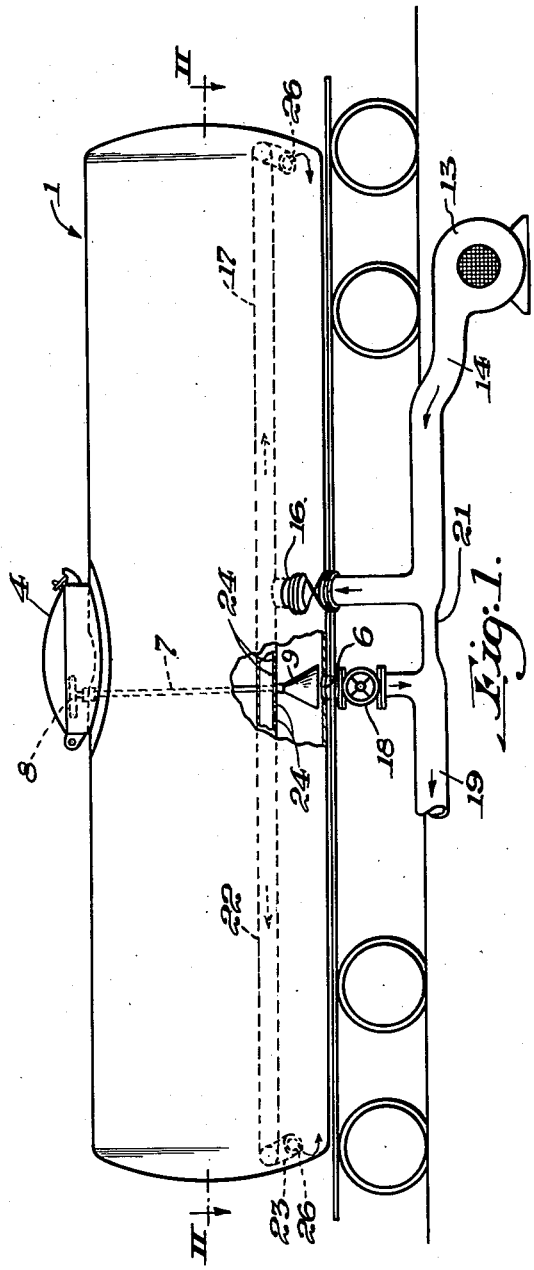
INVENTOR.
MICHAEL J. BOZICH.
BY
Brown, Critchlow, Flick & Peckham
his ATTORNEYS.

Dec. 25, 1951　　　　M. J. BOZICH　　　　2,580,215
APPARATUS FOR UNLOADING PULVERULENT
MATERIAL FROM TRANSPORTATION TANKS
Filed Nov. 4, 1948　　　　　　　　　　　2 SHEETS—SHEET 2

INVENTOR.
MICHAEL J. BOZICH.
BY
Brown, Critchlow, Flick & Peckham
his ATTORNEYS.

Patented Dec. 25, 1951

2,580,215

UNITED STATES PATENT OFFICE 2,580,215

APPARATUS FOR UNLOADING PULVERULENT MATERIAL FROM TRANSPORTATION TANKS

Michael J. Bozich, Pittsburgh, Pa.

Application November 4, 1948, Serial No. 58,254

5 Claims. (Cl. 214—83.28)

This invention relates to tanks for the transportation of dry, pulverulent materials, such as grains, flour, chemical materials, and the like, and is particularly applicable to cylindrical railway, automotive or shipboard tank cars.

In transporting such dry pulverulent materials, it is necessary to keep them absolutely dry and, because such cylindrical, closed and horizontally-disposed tanks can be sealed against the ingress of air and moisture the desirability of using them has long been recognized. Until recently, however, such tanks have not been so used since it has been too difficult to unload them quickly and economically. In my copending patent application, Serial No. 53,608, filed October 9, 1948, there is disclosed a method of unloading dry, pulverulent material from such tanks, as well as pneumatic equipment for so doing. Also, in other copending applications, I have disclosed specifically different equipment capable of unloading such material according to that method. These other copending applications are Serial No. 58,252, filed November 4, 1948; Serial No. 58,253, filed November 4, 1948; and Serial No. 65,274, filed December 14, 1948.

The object of the present invention is to provide a horizontally-disposed cylindrical tank with pneumatic equipment, specifically different from those disclosed in my copending applications, for unloading dry pulverulent material through a discharge opening in the bottom of the tank.

Figure 3:
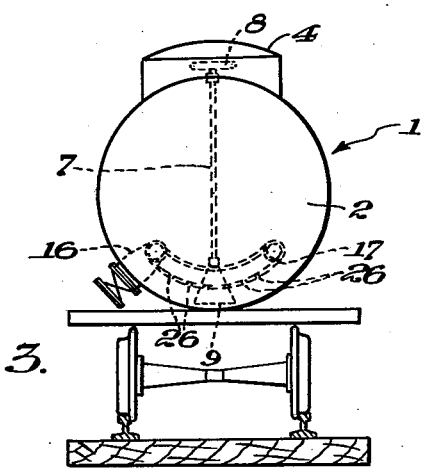
Figure 6:
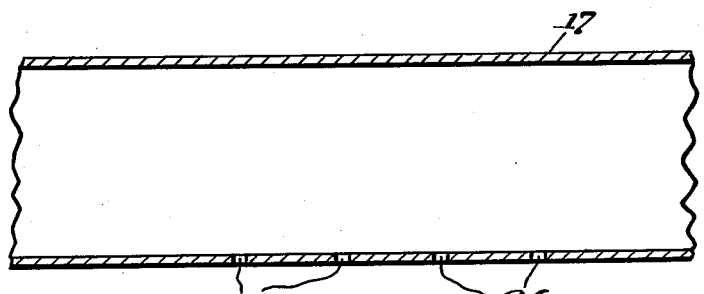
Figure 4:
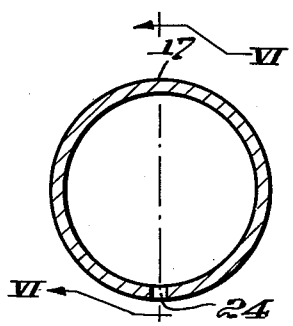
Figure 5:
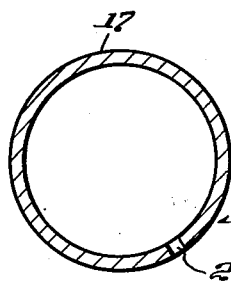

The preferred embodiment of the invention is illustrated in the accompanying drawings of which Fig. 1 is a somewhat diagrammatic illustration of a railway tank car equipped with a specially-constructed pipe for supplying jets of compressed air for unloading dry pulverulent materials from the tank, certain portions of the tank being broken away to illustrate interior elements; Fig. 2 a horizontal sectional view along the line II—II of Fig. 1; Fig. 3 a right-hand end view of the tank car shown in Fig. 1; Figs. 4 and 5 transverse sections along the lines IV—IV and V—V of Fig. 2; and Fig. 6 a longitudinal sectional view taken along the line VI—VI of Fig. 4.

Referring to the drawings, the railway tank car shown includes a tank 1 which is cylindrical in its longitudinal extent and which has concave interior end walls 2 and 3. Centrally along its top it is provided with a hatchway for loading it, this opening being adapted to be closed and sealed by a hatch cover 4, and, directly beneath the hatchway, there is a discharge opening 5 through which the tank load is evacuated.

The discharge opening may be opened or closed by any suitable valve arrangement, but it has been found desirable to utilize valve structure that includes an elongate valve stem 7 extending upwardly into the top hatchway, this stem there being provided with a hand-wheel 8 which, when turned, effects the opening or closing of the discharge opening. The valve arrangement should be such that the turning of handwheel 8 raises or lowers the valve stem to seat or unseat the valve, one common form of such a valve being that in which the stem has a threaded fitting so that turning of the handwheel screws the valve into, or away from, its seated position. It is felt that such valve structure is so well known that no detailed description is necessary for its understanding. The principal reason for using such a vertically movable valve stem is that a baffle 9, Fig. 1, can be welded or otherwise secured to the stem near the discharge opening, this baffle being in the form of a cone and functioning during unloading to control the rate at which the tank is unloaded, as will be explained later.

The pneumatic pressure for evacuating the tank is provided by an air pump 13 (Fig. 1) which is connected by a flexible conduit 14, to an air supply line 16. Conduit 16 is provided, outside of the tank, with a suitable coupling member for making this connection and it projects into the tank where it is connected to the central portion of another air conduit 17 extending longitudinally within the tank. Also, the casing of the valve for controlling discharge opening 6 is provided with a coupling member 18 for connecting it to a flexible discharge conduit 19 leading to the desired storage space, and for purposes to be explained, conduit 19 is connected to flexible air-supply conduit 14 by a short line 21 which, preferably is smaller in diameter than conduit 14.

Generally, load evacuation is accomplished by blowing air out through air conduit 17, certain portions of which are provided with openings directed toward certain interior portions of the tank so as to insure a thorough evacuation of the load. As shown, air conduit 17 is an endless pipe mounted a short distance above the bottom of the tank and extending around the tank along its sides and ends. To facilitate further description, it may be said that conduit 17 includes elongate side portions 22 and lateral end portions 23, side portions 22 being provided centrally, near discharge opening 6, with a series of downwardly directed jet openings 24, and end portions 23 also being provided with another series of downwardly and rearwardly directed jet openings 26. The inclination of these jet openings is illustrated in Figures 4 and 5 but, it should be understood that variations from these specific inclinations are within the contemplation of the invention. Also, unloading is further improved if end portions 23 of the conduit are curved, in the manner illustrated in Figures 1 and 3, to conform to the curvature of the bottom and ends of the tank.

The functions of the various elements which have been described can best be understood by an explanation of an unloading operation. It will be understood that unloading is commenced by connecting up flexible air conduit 14 with air-supply line 16, and also discharge conduit 19 with the discharge opening in the tank. Handwheel 3 of the valve mechanism then is rotated to partially open the discharge opening and the air pressure is turned on.

One of the problems in the use of compressed air to unload such tank cars is that, particularly during the initial part of the unloading, a considerable load is thrown on the air pump and, if suitable means are not provided to control this, the load may become excessive. In the present invention such means include both cone 9 of the valve mechanism and the particular manner in which air conduit 14 is connected up to discharge conduit 19. As to cone 9, its function is to prevent to a considerable degree a gravity discharge of the load through the discharge opening, it having been found that if such gravity flow is permitted, discharge conduit 19 may become too full and, therefore, the load on the air pump may become excessive. Cone 9 is made approximately twice the diameter of discharge opening and is placed directly above the opening so that all of the material being unloaded must enter the discharge opening from beneath. This cone also allows the rate of material discharge to be regulated, since, as stated, it is welded to valve stem 7, so that, as the valve is gradually opened by the upward movement of this stem, the cone is carried upwardly and permits an increasing amount of material to flow beneath it. Preferably, the cone is so placed that when the valve is closed it rests upon the bottom of the tank, and when the valve is fully open, the bottom of the cone is four or five inches above the discharge opening.

As stated, the interconnection of the air inlet 14 and material discharge line 19 also avoids the creation of excess load on the pump, this being due to the fact that short line 21 carries some of the air blast from the pump to discharge line 19, thus aiding in clearing out the material in this discharge line 19. As is seen, line 21 is smaller in diameter than air inlet conduit 14 so that most of the air blast is carried into the tank, the diameters of these lines being approximately three and eight inches, respectively.

The material in the tank is moved toward the discharge opening by the air blowing through jet openings 24 and 26 of air conduit 17, jet opening 24 directing the blast downwardly in a vertical direction thereby causing material near it to move toward the center of the tank, and jet openings 26 directing the blast rearwardly and downwardly as shown by the arrows in Fig. 1 so as to move the material from the ends toward the center of the tank. With such an arrangement it has been found that a tank load of material can be economically evacuated in a relative short period of time.

It is, of course, intended that various materials be transported in these tanks and it will be found that for different materials, the sizing and positioning of the air conduits and the jet openings, as well as the positioning of cone 9 should be varied. Thus, by way of example, and not of limitation, unloading of a tank filled with granular material, such as wheat, is most efficiently conducted with an air conduit shaped in the manner shown, of approximately a six inch diameter. Also, this conduit should be positioned about half way between the tank bottom and its center line and about one-quarter of the way in from the tank and should extend substantially the full length of the tank. Jet openings in the end portion of the conduit are made sufficiently large to move the granular materials to the center of the car and preferably, are about one and one-quarter inch in diameter with a center-to-center spacing of six to nine inches. Openings 24 in the central portion of the conduit also are about one and one-quarter inch in diameter, and, as seen in Fig. 1, are formed only about that portion of the conduit which is near the discharge opening. The air pressure for unloading the tank is somewhat optional, but the unloading is more economical if a relatively low pressure of approximately ten pounds per square inch is used. However, as indicated, the above is but a single example of an appropriate arrangement for a particular type of load, and the dimensions given may and should be varied for loads of different density and character.

According to the provisions of the patent statutes, I have explained the principle of my invention and have illustrated and described what I now consider to represent its best embodiment. However, I desire to have it understood that, within the scope of the appended claims, the invention may be practiced otherwise than as specifically illustrated and described.

I claim:

1. Apparatus for transporting dry pulverulent material comprising a horizontally-disposed, cylindrical tank car having concave inner end walls and also having its bottom portion provided centrally with a discharge opening, an endless air conduit carried within the tank midway between its bottom and center line, the conduit extending longitudinally along its sides and laterally across its ends, said lateral portions each being downwardly and outwardly curved in conformity with the curvature of the tank bottom and end walls, said longitudinal portions each being provided centrally with a series of downwardly directed jet openings and said lateral portions each being provided with a series of jet openings directed downwardly and toward the adjacent tank end, and means for supplying said conduit with compressed air for removing through said discharge opening a load of dry pulverulent material.

2. Apparatus for transporting dry pulverulent material comprising a horizontally-disposed, cylindrical tank car having concave inner end walls and also having its bottom portion provided centrally with a discharge opening, an endless air conduit disposed within its bottom portion and extending longitudinally along its sides and laterally across its ends, said longitudinal portions each being provided centrally with a series of downwardly directed jet openings and said lateral portions each being provided with a series of jet openings directed downwardly and toward the adjacent tank end, means for supplying said conduit with compressed air for removing through said discharge opening a load of dry pulverulent material, a valve within said tank closing said discharge opening, and means for raising said valve vertically upwardly from said valve-closing position, said valve being sized and shaped to cause material being discharged to flow beneath it to enter the discharge opening.

3. Apparatus for transporting dry pulverulent material comprising a horizontally-disposed, cylindrical tank car having concave inner end walls and also having its bottom portion provided centrally with a discharge opening, an endless air conduit disposed within its bottom portion and extending longitudinally along its sides and laterally across its ends, said longitudinal portions each being provided centrally with a series of downwardly directed jet openings and said lateral portions each being provided with a series of jet openings directed downwardly and toward the adjacent tank end, means for supplying said conduit with compressed air for removing through said discharge opening a load of dry pulverulent material, and valve mechanism for opening and closing said discharge opening, said mechanism including a vertically movable valve stem and a cone-shaped valve carried by the stem directly above the discharge opening, said cone valve being larger than said opening whereby when the valve is raised material being discharged must flow beneath it to enter the discharge opening.

4. Apparatus for transporting dry pulverulent material comprising a horizontally-disposed cylindrical tank car having concave inner end walls and also having its bottom portion provided centrally with a discharge opening, an endless air conduit disposed within its bottom portion and extending longitudinally along its sides and laterally across its ends, said longitudinal portions each being provided centrally with a series of downwardly directed jet openings and said lateral portions each being provided with a series of jet openings directed downwardly and toward the adjacent tank end, an air pump, an air supply line connecting said endless conduit with said pump for supplying the conduit with compressed air for removing through said discharge opening a load of dry pulverulent material, a material discharge line for carrying said removed material from the tank, and a connecting line communicating said supply line with said discharge line for conducting a portion of the compressed air directly into the discharge line, said connecting line having at least a portion thereof sufficiently restricted in diameter to force a major portion of the compressed air into said endless air conduit.

5. Apparatus for transporting dry pulverulent material comprising a horizontally-disposed, cylindrical tank car having concave inner end walls and also having its bottom portion provided centrally with a discharge opening, an endless air conduit disposed within its bottom portion and extending longitudinally along its sides and laterally across its ends, said longitudinal portions each being provided centrally with a series of downwardly directed jet openings and said lateral portions each being provided with a series of jet openings directed downwardly and toward the adjacent tank ends, an air pump, an air supply line connecting said endless conduit with said pump for supplying the conduit with compressed air for removing through said discharge opening a load of dry pulverulent material, a material discharge line for carrying said removed material from the tank, a connecting line connecting said supply line with said discharge line for conducting a portion of the compressed air directly into the discharge line, said connecting line having at least a portion thereof sufficiently restricted in diameter to force a major portion of the compressed air into said endless air conduit, a valve within said tank closing said discharge opening, and means for raising said valve vertically upward from valve-closing position, said valve being sized and shaped to cause material flowing beneath it to enter the discharge opening.

MICHAEL J. BOZICH.

REFERENCES CITED

The following references are of record in the file of this patent:

UNITED STATES PATENTS

| Number | Name | Date |
|---|---|---|
| 1,465,665 | Grindle | Aug. 21, 1923 |
| 1,970,405 | Thomas | Aug. 14, 1934 |

FOREIGN PATENTS

| Number | Country | Date |
|---|---|---|
| 463,953 | Germany | Aug. 6, 1928 |
| 754,236 | France | Nov. 3, 1933 |
| 757,623 | France | Dec. 29, 1933 |